Patented Nov. 9, 1937

2,098,839

UNITED STATES PATENT OFFICE 2,098,839

REFRACTORY MATERIAL

John D. Sullivan, Columbus, Ohio, assignor to The Battelle Memorial Institute, Columbus, Ohio, a corporation of Ohio No Drawing. Application September 28, 1934, Serial No. 745,975

3 Claims. (Cl. 106—9)

My invention relates to a refractory material. More specifically, it relates to a basic refractory mainly comprising magnesium oxide and to the method of making such refractory material. It is especially important in the manufacture of magnesite brick, though it is capable of application to the making of monolithic linings for furnaces and other products.

Basic refractory bricks made of dead-burned magnesite and commonly known as magnesite bricks are favorably known in the ceramic, metallurgical and chemical industries. They are used extensively in the construction of furnaces where basic slags are encountered, since the use of a basic brick in contact with a basic slag serves to avoid excessive corrosion and reaction with molten slags and obviates other disadvantages.

At the present time, there are two types of magnesite bricks being marketed, namely, burned magnesite bricks and unburned magnesite bricks. Before being made into brick form, however, it is essential, in order to minimize shrinkage, that the magnesite used in making the bricks be dead-burned to a high specific gravity. In the practice in this country, the use of a bonding material is not common, especially in the case of burned or fired-bricks. The dead-burned magnesite is either crushed or ground or both until the desired degree of fineness is attained and it is then mixed in a suitable apparatus with a small amount of water. The bricks are then formed in a press by use of suitable pressure. If the bricks thus formed are to be fired, they are then piled on a suitable conveyance and dried in a suitable manner. They must be set in the kiln or on the cars, if tunnel kilns are used for firing, with care because before or during firing they are easily deformed by a slight load. Usually they are boxed in with silica brick in such a manner that there is practically no load upon them. They are fired to a burning temperature of about cone 18 and maintained at this temperature for at least 24 hours.

The method of making unburned brick is substantially the same as that of making the fired or burned brick, except that the firing step is omitted. However, higher pressing pressures are frequently employed. Sometimes inorganic binders such as clay, chromite, and other ingredients are used in these unburned bricks.

In the European practice of manufacturing burned bricks, it is quite common to use bonds for holding the magnesite grains together, at least, until sintering takes place. Temporary bonds such as tar, molasses and dextrine have been used. Such inorganic bonds as serpentine, clay and sodium silicate have also been used. All of these inorganic binders, including clay, when used in amounts large enough to be effective, lower the refractoriness of the bricks and also adversely affect their basic nature.

While the magnesite bricks hitherto marketed have certain advantages, they also have serious disadvantages both from the viewpoint of manufacture and the physical properties of the finished product. The usual type of magnesite brick, after pressing and before drying and firing, is very fragile and must be handled with utmost care. In the firing operation, great care must be exercised because the bricks are easily deformed under a slight load, as indicated by the customary practice of boxing with the silica bricks.

Furthermore, these prior-art bricks spall badly with sudden temperature changes. The coefficient of expansion of magnesium oxide is quite uniform with changes in temperature; so it is apparent that spalling by temperature changes is due to failure of the bond between the grains of magnesite particles rather than to the inherent properties of the magnesite grains. This bond between the grains is merely such bond as results from the sintering action produced at the temperature of firing.

Furthermore, magnesite bricks, as hitherto made, have been subject to slaking, especially slaking in steam. This slaking is mainly due to the poor bond between the grains because grain magnesite when fully dead-burned or fused is not particularly susceptible to slaking. In fact, most of the disadvantages of magnesite brick can be traced to the bond holding the grains of magnesium oxide together.

This invention relates more particularly to a product formed from magnesium oxide grains and to the bond material which binds such grains together. It comprises the utilization of a hydraulic cement as the bond for the magnesite grains and preferably a basic cement. This cement is to be used in the making of both the burned and unburned bricks or other products. To date, I have found that dolomite cement is especially advantageous and has characteristics which are superior to or not possessed by other hydraulic cements which I have tried. This cement is produced by grinding to a powder form, preferably at least 80 per cent to pass a 200-mesh sieve, a stable clinker made from raw dolomite. A stable clinker is defined in this case as one that does not dust or slake. Such a clinker is produced by mixing raw dolomite, silica, and a fluxing agent, which preferably is aluminum oxide, iron oxide, or both in suitable proportions, and firing for a sufficient period of time at a sufficient temperature to produce a clinker in which the magnesium oxide exists largely as periclase; the iron oxide largely as calcium ferrite; the aluminum oxide largely as calcium aluminate; and the silica largely as tricalcium silicate. The stable clinker is characterized by the free periclase, the large amount of tricalcium silicate, the substantially small amount of dicalcium silicate and free lime, and the presence of calcium ferrite or calcium aluminate which stabilizes the small amount of dicalcium silicate present. Stable clinker can be produced by mixing roughly 5 to 10 parts of silica, 0.5 to 15 parts of iron or aluminum oxide, in suitable ratios, and sufficient raw dolomite to total 100 parts. The raw ingredients are ground so that virtually all will pass through a 100-mesh sieve, and then clinkered in a suitable apparatus, for example, a rotary kiln. The temperature of clinkering may be about 2500 to 2700° F. or higher. Other ratios of silica, flux, and dolomite may be used than those stated, but the examples given suffice to show that the manufacture of stable clinker is easily within commercial possibilities. The ground stable clinker is designated as "dolomite cement".

Dolomite cement is hydraulic in nature. It is not only a basic cement but also a refractory one. Since it is comprised chiefly of periclase, tricalcium silicate, and calcium ferrite or aluminate, it is basic in nature and as such is an excellent bond for such a material as basic magnesite. Since it is of similar chemical nature it will not react appreciably with the magnesite or ruin the refractoriness of the latter by a fluxing action. It is itself refractory. It has been found, for example, that dolomite cement made from 87 parts raw dolomite, 7 parts silica, and 3 parts $Fe_3O_4$ or $Al_2O_3$, has a p. c. e. value of above cone 32. Being refractory it can be used in appreciable amounts without substantially affecting the refractory properties of magnesite.

Since dolomite cement is especially suitable for my purpose, it will be first discussed as the binder. It is to be understood, however, that this is illustrative and that this invention is not limited to dolomite cement, and that Portland, alumina, or similar hydraulic cements are within its scope, although perhaps not so desirable.

As related to the manufacture of magnesite bricks, the new invention may be described as follows: Grain magnesite of a predetermined sieve analysis is mixed with a requisite amount of dolomite cement. Preferably the magnesite and dolomite cement are mixed together in the dry condition, and after thorough mixing sufficient water is added to permit the material to be formed by pressure in the so-called "dry" process for brick manufacture. The water also acts in a second capacity—that of supplying fluid for reaction with the dolomite cement and permitting the latter to set. The amount of dolomite cement used may vary over wide ranges depending on the properties desired in the resulting product. Preferably not over 15 per cent of dolomite cement, by weight, should be used, although for some purposes this amount may be exceeded. Using good quality dead-burned grain magnesite and up to 15 per cent of dolomite cement, the p. c. e. value of the resulting product is in excess of cone 38. Thus, it possesses satisfactory refractoriness. It has been found for magnesite bricks that 7 per cent of dolomite cement, by weight, is a desirable addition. However, lower percentages can be used in some instances. In fact, I may use as low as 2 per cent of dolomite cement, by weight.

The bricks after pressing in a suitable apparatus preferably under high pressure may be kept moist for a period of time. If they are to be burned or fired, they are then dried in any suitable drier or in air and then fired. The dolomite cement acts strictly as a cement before the firing operation. In fact, before drying, it gives considerable green strength and obviates the fragility before drying which is characteristic of the prior-art magnesite bricks. After the cement sets, these bricks possess excellent properties and may be piled on top of each other in the kiln, or on the carriage if a tunnel kiln is employed, so that the cumbersome and expensive boxing with silica bricks in firing is rendered unnecessary.

The bricks are fired to a substantial temperature, preferably about cone 18 or 20, although higher firing temperatures may be used. In some cases it may be even possible to fire below cone 18. The cement clinkers at the firing temperature and the ceramic bond so formed is even stronger than the cement bond. The bricks possess substantial strength and load-bearing characteristics throughout the entire firing range.

Because of the properties of the bond, the bricks may be fired more rapidly than the prior-art magnesite bricks and the time in which they are held at the maximum temperature may be substantially reduced. It results therefore that a more rapid and cheaper production of magnesite bricks is rendered possible.

Unfired bricks are fabricated and pressed in the same manner as burned bricks, although in some instances it may be desirable to use higher pressures. Also it is preferable to keep unburned bricks in a moist condition for several days before drying in order to permit the cement to acquire a stronger set, and consequently to give greater strength to the brick. The unburned bricks, after drying, can be used in the usual manner now followed in the metallurgical art.

Unburned bricks made by my process may be further protected from weathering by treating the bricks after their formation and drying with an oil-water emulsion capable of producing a water-resistant film. Bricks may be protected by dipping them in a suitable oil-water emulsion. Bricks so treated are at least semi-water proof and are thus protected even when stored out of doors. Obviously, many different kinds of oils may be used, and likewise methods of application other than dipping may be employed. Moreover, the weather-proofing material need not be an oil-water emulsion. Any substance or material that will protect the surface may be used.

While in the foregoing discussion dolomite cement was used to illustrate the method, since it has special advantages in connection therewith, it is to be understood that other hydraulic cements such as Portland, natural, alumina, slag or Puzzolan cements may be used. Such cements are preferably used in substantially the same amounts as dolomite cement, and the manner of manufacturing both unburned and burned bricks is preferably substantially the same as that described for dolomite cement.

As a source of magnesite, any high-grade variety of dead-burned or sintered or fused magnesite may be employed. Ordinary dead-burned magnesite containing 87 to 93 per cent of magnesium oxide is very satisfactory. Magnesite with even lower magnesium oxide content may be used although the refractoriness of the resulting product is not so good. In general, it may be said that the same kinds of magnesite may be used as those currently used for making magnesite bricks. The cement is considered as one of the ingredients of a predetermined sieve analysis.

Burned and unburned magnesite bricks bonded with cement as covered in this invention have excellent physical properties. The bricks have adequate strength from the time of formation throughout the entire firing range, and also at working temperatures. Bricks so made have greater resistance to load at high temperatures than any magnesite brick now manufactured. Whereas ordinary magnesite bricks fail under a load of 25 pounds per square inch at 2400 to 2500° F., and especially prepared bricks at 2600 to 2700° F., burned bricks have been made according to this invention which did not fail at a temperature of approximately 2900° F., under like conditions of testing.

Magnesite bricks made with cement as a binder are more resistant to spalling by sudden temperature changes than prior art magnesite bricks. Cement-bonded bricks are also more resistant to slaking in the presence of steam. This is especially true of bricks bonded with dolomite cement.

As indicated above, with the use of dolomite cement as a bond, clinkering of the cement occurs during the firing. This is obvious from the fact that, in the manufacture of the clinker from which dolomite cement is made, the temperature of clinkering is about 2500 to 2700° F. Consequently, when the cement-bonded article is heated to this temperature or more in firing, the cement clinkers again, so that the magnesite grains are bound together by a clinkering or ceramic bond. Since the clinker from which this dolomite cement is made is stable to slaking and dusting, this bond made by reclinkering is likewise stable, and the resulting brick is also stable. Likewise, when cements other than dolomitic cement are used, the cement is clinkered at the temperature of firing the bricks. With magnesite brick bonded by cement, the conversion of the cement into a clinkering or ceramic bond results in burned bricks having greater strength than the unburned bricks, though the unburned bricks have strength adequate for all purposes for which they may be used.

The product obtained by the use of my cement bond has excellent physical properties throughout the entire temperature range of manufacture and use. The bricks are stronger under elevated temperatures and less susceptible to slaking and spalling than prior art magnesite bricks. They are also sufficiently refractory for any purpose for which magnesite bricks are currently used.

While the discussion so far has been devoted largely to magnesite bricks, this invention is much broader and concerns the use of a hydraulic cement as a bond for any article made of grain magnesite. One such use is in monolithic linings for furnaces. At the present time no satisfactory method for making monolithic linings of magnesite is employed. Various temporary bonds such as dextrine, tar, or asphalt have been used but have been found unsatisfactory. Inorganic bonds such as sodium silicate and clay lower the refractoriness of the lining. A mixture comprising a slip of finely ground grain magnesite and water has been used as a bond, but it loses its strength at elevated temperatures. I have found that cement is an excellent bond for making monolithic linings of grain magnesite. The cement is used in substantially the same amounts as in the manufacture of magnesite bricks. Monolithic linings utilizing cement are made in the usual manner well known to the art, and the methods need not be discussed here. Likewise, cement-bonded magnesite can be used as a patching material for use in repairing furnace linings, bottoms, etc.

Magnesite crucibles are widely used in making small-scale melts of various kinds. Especially are magnesite crucibles used in making special steel in induction furnaces. While such crucibles are excellent from a chemical standpoint, present crucibles possess poor physical properties. They are especially susceptible to spalling and have poor strength at elevated temperatures. These poor properties are largely due to the character of the bond between the grains of magnesite. It has been found that crucibles of excellent physical properties may be produced by use of cement as a binder. The amount of cement used is substantially the same as that used in making magnesite brick. Preferably the crucible is formed under high pressure to reduce porosity, and is permitted to remain in a moist condition for at least 24 hours to permit the cement to set, and is then dried. The crucible may then be fired to a temperature of about cone 18 or 20, and after cooling is ready for use. It is also possible to use the crucible in the unburned or unfired condition, and to utilize the heating in the furnace in which it is used to effect a firing of the product. Crucibles made with cement as a binder not only have better physical properties such as strength and resistance to spalling, but also have less porosity and consequently are less susceptible to attack by molten metal or slag.

For use in monolithic linings, patchings, and similar purposes, any of the hydraulic cements that can be used for brick manufacture may be employed. As in the case of the manufacture of magnesite bricks, dolomite cement is especially advantageous and has characteristics which are superior to or not possessed by other hydraulic cements. However, it is within the scope of this invention to use any hydraulic cement similar to these described above. As a source of magnesium oxide similar raw materials as those previously described for bricks may be used.

It will be seen from the above that my invention results in a novel type of magnesite product wherein the grains of magnesite are held together in the unburned state by a hydraulic cement bond and in the burned state by a clinkering or ceramic bond. It results that excellent magnesite bricks, monolithic linings, patching mixture, crucibles and other articles may be manufactured cheaply and effectively. Though it will have a lower melting point than the magnesite grains, in most cases, the melting point of the bond will be sufficiently high that the bond will not appreciably affect the refractoriness of the magnesite products. It is a bond that will be adequately effective both in the unburned and the burned products. Other advantages of the invention have already been set forth.

The use of the term "magnesite grains" or "grains of magnesite or magnesium oxide" is not intended to limit the size of the particles of magnesite which may be bonded together by my cement. Such particles may vary as to size without departing from the spirit of this invention. The term "magnesite grains" as used in the claims is further intended to include the product obtained from dead-burning, sintering, or fusing of raw magnesite.

Having thus described my invention, what I claim is:

1. An article of manufacture comprising magnesite grains bound together by hydrolysis of a cement formed of a ground stable clinker consisting chiefly of periclase, tricalcium silicate and calcium ferrite or aluminate, which clinker has been fired at a temperature of about 2500° F. or more for a period of time sufficient to render it stable against slaking and dusting.

2. An article of manufacture in the form of an unfired product comprising magnesite grains bound together by a bonding agent in the form of a ground stable clinker consisting chiefly of periclase, tricalcium silicate and calcium ferrite or aluminate, which clinker has been fired at a temperature of about 2500° F. or more for a period of time sufficient to render it stable against slaking and dusting.

3. An article of manufacture comprising magnesite grains bound together by a bonding agent in the form of a ground stable clinker produced by firing at a temperature of about 2500° F. or more a mixture comprising from 5 to 10 per cent of silica, 0.5 to 15 per cent of aluminum oxide or iron oxide, and the balance substantially all dolomite, for a period of time sufficient to render it stable against slaking and dusting.

JOHN D. SULLIVAN.